United States Patent
Yamamoto et al.

(10) Patent No.: US 6,643,245 B2
(45) Date of Patent: Nov. 4, 2003

(54) OPTICAL ELEMENT, LIGHT SOURCE APPARATUS, OPTICAL HEAD APPARATUS, AND OPTICAL INFORMATION PROCESSING APPARATUS

(75) Inventors: Hiroaki Yamamoto, Hyogo (JP); Hideki Hayashi, Nara (JP); Shin-ichi Kadowaki, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 321 days.

(21) Appl. No.: 09/892,583

(22) Filed: Jun. 27, 2001

(65) Prior Publication Data

US 2002/0015302 A1 Feb. 7, 2002

(30) Foreign Application Priority Data

Jun. 29, 2000 (JP) ........................................ 2000-196399

(51) Int. Cl.$^7$ ................................................. G11B 7/00
(52) U.S. Cl. ............................. 369/112.01; 369/112.05
(58) Field of Search .......................... 369/44.37, 44.23, 369/44.12, 112.03, 112.05, 112.1, 112.15, 112.16, 112.22, 112.01, 110.01, 110.02, 110.03, 110.04, 53.2, 53.22, 53.23, 94, 112.17, 112.18

(56) References Cited

U.S. PATENT DOCUMENTS

| | | | |
|---|---|---|---|
| 6,043,911 A | 3/2000 | Yang | |
| 6,072,579 A | * | 6/2000 | Funato .................. 369/112.15 |
| 6,130,872 A | | 10/2000 | Sugiura et al. |
| 6,185,176 B1 | | 2/2001 | Sugiura et al. |
| 6,272,098 B1 | * | 8/2001 | Takahashi et al. ..... 369/112.17 |

FOREIGN PATENT DOCUMENTS

| | | |
|---|---|---|
| JP | 10-289468 | 10/1998 |
| JP | 10-319318 | 12/1998 |
| JP | 10-320814 | 12/1998 |
| JP | 10-326428 | 12/1998 |
| JP | 11-110785 | 4/1999 |
| JP | 11-161996 | 6/1999 |

OTHER PUBLICATIONS

Jun. 1997, Mizuno et al., "Optical Head for DVD with Integrated Optical Unit", *National Technical Report*, Vo. 43, No. 3, pp. 55–62 and English abstract.

* cited by examiner

Primary Examiner—Thang V. Tran
(74) Attorney, Agent, or Firm—Merchant & Gould, P.C.

(57) ABSTRACT

A first semiconductor laser emits a light beam L1 with a first wavelength polarized in an x-axis direction. A second semiconductor laser emits a light beam L2 with a second wavelength polarized in the x-axis direction. A wavelength plate functions as a $(2m+1)\lambda/2$ plate (m is an integer) with respect to the light beam L1, and functions as a $n\lambda$ plate (n is an integer) with respect to the light beam L2. A polarization anisotropic hologram element diffracts the light polarized in the x-axis direction, and transmits the light polarized in the y-axis direction. Consequently, an apparent emission point of diffracted light L2' may be allowed to coincide with an emission point of the light beam L1. A light source apparatus thus constructed can emit two light beams with different wavelengths at a low cost and a high efficiency with optical axes aligned in a simple configuration.

21 Claims, 9 Drawing Sheets

ND OPTICAL INFORMATION
OPTICAL ELEMENT, LIGHT SOURCE APPARATUS, OPTICAL HEAD APPARATUS, AND OPTICAL INFORMATION PROCESSING APPARATUS

BACKGROUND OF THE INVENTION

1. Field of the Invention

The present invention relates to an optical head apparatus for reproducing or deleting information recorded on an optical medium such as an optical disk and an optical card, or recording information onto the optical medium. The present invention also relates to a light source apparatus and an optical element used in such an optical head apparatus. Furthermore, the present invention relates to an optical information processing apparatus including an optical head apparatus.

2. Description of the Related Art

In recent years, with the development of an optical disk, standards of various kinds of optical disks, such as recording/reproducing optical disks and read-only memory (ROM) optical disks, have been proposed and utilized. Various kinds of different laser beams are used often with respect to these optical disks. In such a circumstance, an optical head is proposed that has light sources with two wavelengths so that, in the same apparatus, information can be recorded onto/reproduced from different kinds of incompatible optical disks using different laser beams. Such a procedure is disclosed by Sadao Mizuno et al. "Optical head for Integrated DVD" (National Technical Report Vol. 43, No. 3, June, p. 275 (1997)). In such an optical head, it is required to dispose each light source point on a common optical axis.

As a procedure for realizing the above, optical axes of light beams from two light sources generally are aligned by a dichroic mirror. In order to simplify an optical system, a method for aligning optical axes using a diffraction element also is proposed (JP 11(1999)-110785 A, JP 10(1998)-320814 A, JP 10(1998)-326428A, and JP 10(1998)-319318 A). However, the diffraction element with the above-mentioned configuration generates not only diffracted light but also transmitted light, resulting in a light source with an unsatisfactory light utilization efficiency.

In order to solve the above-mentioned problem, a method using a polarization anisotropic hologram is proposed (JP 11(1999)-161996 A, JP 10(1998)-289468 A).

Hereinafter, a conventional light source and optical head apparatus will be described by illustrating JP 11(1999)-161996 A.

Figure 16:
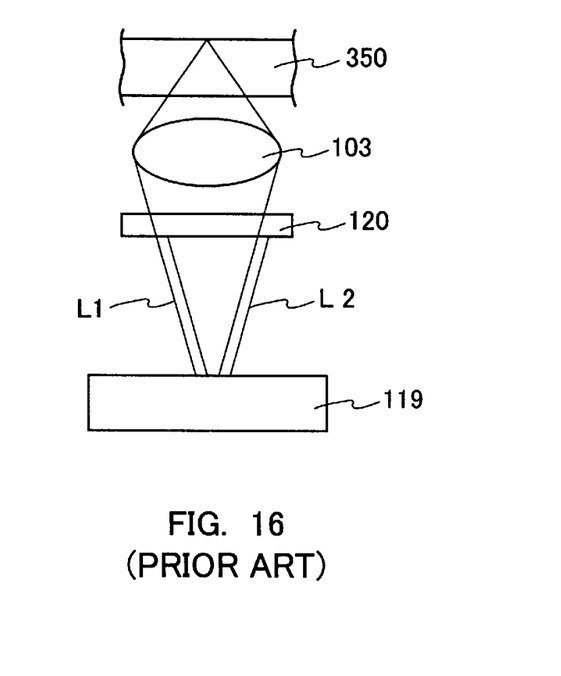
FIG. 16 shows a configuration of a conventional optical head apparatus.

FIG. 16 shows a configuration of a conventional optical head apparatus. Two different semiconductor lasers are provided in a package 119 (described later) so as to emit light beams L1 and L2 with different wavelengths in an upward direction of the package 119 from different points. Furthermore, the light beams L1 and L2 are polarized so that their polarization directions are orthogonal to each other. The light (L1 and L2) output from the package 119 is incident upon a polarization splitting hologram 120. The polarization splitting hologram 120 diffracts light polarized in a particular direction, and transmits light polarized in a direction orthogonal to the particular direction. Herein, the polarization splitting hologram 120 is disposed so as to diffract the light beam L2 and transmit the light beam L1.

The polarization splitting hologram 120 is designed so that the light beam L2 is diffracted, and an apparent emission point of the diffracted light coincides with an emission point of the light beam L1. Thus, the optical axes of the light beams L1 and L2 are aligned. The resultant light is incident upon an objective lens 103, and condensed onto a recording surface of an optical disk 350 by the objective lens 103.

Figure 17A:
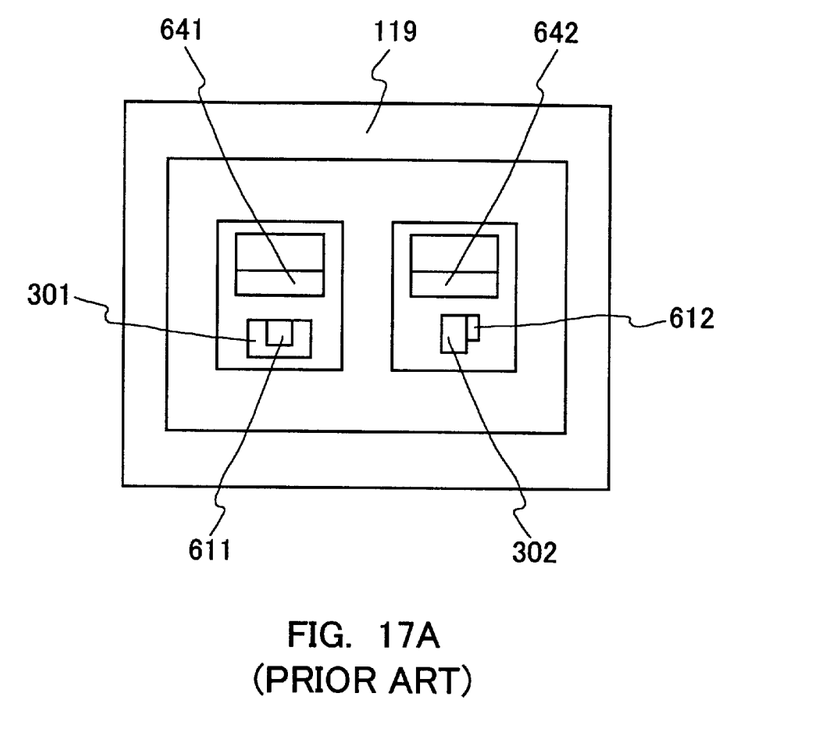
FIG. 17A is a plan view showing a configuration of a conventional light source apparatus.
Figure 17B:
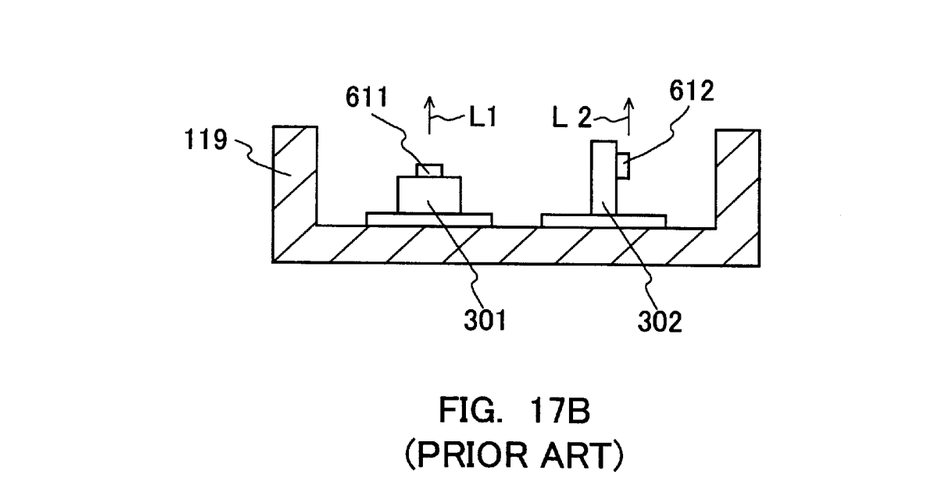
FIG. 17B is a cross-sectional side view thereof.

Next, light sources in the package 119 will be described with reference to FIGS. 17A and 17B. FIG. 17A is a plan view seen from an output direction of the package 119, and FIG. 17B is a cross-sectional view in a plane of the package 119 substantially parallel to an optical axis. Semiconductor lasers 611 and 612 are provided in the package 119, and respectively emit light beams L1 and L2. The semiconductor lasers 611 and 612 are attached to the package 119 via holders 301 and 302 so that the polarization directions of emitted light beams are orthogonal to each other. Light beams emitted from the semiconductor lasers 611 and 612 are reflected in an upward direction of the package 119 by reflective mirrors 641 and 642.

Because of the above-mentioned configuration, a high-efficiency two-wavelength optical head with optical axes aligned can be realized.

Furthermore, JP 11(1999)-161996 A discloses an optical head apparatus using, as the semiconductor lasers 611 and 612, those which oscillate in different polarization directions and are disposed in the same direction. Even with the use of this technique, a high-efficiency two-wavelength optical head apparatus with optical axes aligned can be realized.

However, according to the method of JP 11(1999)-161996 A, it is required to mount the semiconductor lasers 611 and 612 in the package 119 in different directions so that polarization directions of two wavelengths are orthogonal to each other, which results in a complicated configuration and a high production cost.

Furthermore, according to the method using semiconductor lasers oscillating in different polarization directions and disposed in the same direction as disclosed in JP 10(1998)-289468 A, it is difficult to realize a semiconductor laser that oscillates stably in a TE mode, and the production cost thereof also is high.

SUMMARY OF THE INVENTION

Therefore, with the foregoing in mind, it is an object of the present invention to provide an inexpensive light source apparatus that generates two light beams with different wavelengths at a high efficiency. Another object of the present invention is to provide a low-cost optical element that is capable of generating two light beams with different wavelengths at a high efficiency. Still another object of the present invention is to provide an optical head apparatus and an optical information processing apparatus using such a light source apparatus. Still another object of the present invention is to provide a method for adjusting positions of emission points in such a manner that apparent positions of light sources of two light beams with different wavelengths are aligned with each other as desired.

In order to achieve the above-mentioned objects, the present invention has the following construction.

A light source apparatus according to a first construction of the present invention includes: a first light source for emitting light having a first wavelength and polarized in a first direction; a second light source for emitting light having a second wavelength different from the first wavelength and polarized in the first direction; a wavelength plate that functions substantially as a $(2m+1)\lambda/2$ plate (m is an integer) with respect to light having the first wavelength, and functions substantially as a nλ plate (n is an integer) with respect to light having the second wavelength; and a diffraction element that diffracts light polarized in the first direction and transmits light polarized in a second direction orthogonal to the first direction, wherein the wavelength plate converts light emitted from the first light source into light polarized in the second direction so as to transmit it, and transmits light emitted from the second light source without converting a polarization direction thereof, and the diffraction element diffracts light emitted from the second light source, passing through the wavelength plate, whereby the light emitted from the second light source, diffracted by the diffraction element, has an apparent emission point different from an emission point of the second light source. According to this construction, a light source apparatus can be provided at a low cost in a simple configuration, which is capable of emitting two light beams having different wavelengths with optical axes aligned at a high efficiency.

In the above-mentioned first light source apparatus, the apparent emission point of the light emitted from the second light source can be allowed to coincide with an emission point of the first light source. According to this construction, a light source apparatus can be provided that emits two light beams with different wavelengths from an apparently common emission point.

Furthermore, in the above-mentioned first light source apparatus, in the case where the first light source emits light having directivity in a particular direction, the apparent emission point of the light emitted from the second light source can be positioned in the particular direction from an emission point of the first light source. According to this construction, a light source apparatus can be provided that emits two light beams with different wavelengths from two emission points at different positions on an apparently identical optical axis.

The above-mentioned first light source apparatus further may include a second wavelength plate that functions substantially as a $(2m'+1)\lambda/2$ plate (m' is an integer) with respect to light having the first wavelength, and functions substantially as a n'λ plate (n' is an integer) with respect to light having the second wavelength, wherein the second wavelength plate converts the light emitted from the first light source, which is converted into light polarized in the second direction, into light polarized in the first direction. According to this construction, a light source apparatus can be provided that emits two light beams having an identical polarization direction and different wavelengths.

Furthermore, a light source apparatus according to a second construction of the present invention includes: a first light source for emitting light having a first wavelength and polarized in a first direction; a second light source for emitting light having a second wavelength different from the first wavelength and polarized in the first direction; a wavelength plate that functions substantially as a nλ plate (n is an integer) with respect to light having the first wavelength, and functions substantially as a $(2m+1)\lambda/2$ plate (m is an integer) with respect to light having the second wavelength; and a diffraction element that transmits light polarized in the first direction and diffracts light polarized in a second direction orthogonal to the first direction, wherein the wavelength plate converts light emitted from the second light source into light polarized in the second direction so as to transmit it, and transmits light emitted from the first light source without converting a polarization direction thereof, and the diffraction element diffracts the light emitted from the second light source, passing through the wavelength plate, whereby the light emitted from the second light source, diffracted by the diffraction element, has an apparent emission point different from an emission point of the second light source. According to this construction, a light source apparatus can be provided at a low cost in a simple configuration, which is capable of emitting two light beams having different wavelengths with optical axes aligned at a high efficiency.

In the above-mentioned second light source apparatus, the apparent emission point of the light emitted from the second light source can be allowed to coincide with an emission point of the first light source. According to this construction, a light source apparatus can be provided that emits two light beams with different wavelengths from an apparently common emission point.

Furthermore, in the above-mentioned second light source apparatus, in the case where the first light source emits light having directivity in a particular direction, the apparent emission point of the light emitted from the second light source can be positioned in the particular direction from an emission point of the first light source. According to this construction, a light source apparatus can be provided that emits two light beams with different wavelengths from two emission points at different positions on an apparently identical optical axis.

The above-mentioned second light source apparatus further may include a second wavelength plate that functions substantially as a n'λ plate (n' is an integer) with respect to light having the first wavelength and functions substantially as a $(2m'+1)\lambda/2$ plate (m' is an integer) with respect to light having the second wavelength, wherein the second wavelength plate converts the light emitted from the second light source, which is converted into light polarized in the second direction, into light polarized in the first direction. According to this construction, a light source apparatus can be provided that emits two light beams having an identical polarization direction and different wavelengths.

Next, an optical element according to a first construction of the present invention includes: a wavelength plate that functions substantially as a nλ plate (n is an integer) with respect to light having a first wavelength, and functions substantially as a $(2m+1)\lambda/2$ plate (m is an integer) with respect to light having a second wavelength; and a diffraction element that transmits light polarized in a first direction and diffracts light polarized in a second direction orthogonal to the first direction, wherein the wavelength plate and the diffraction element are disposed so that an angle formed by an advanced-phase axis of the wavelength plate and the first direction is substantially 45°. According to this construction, by allowing light emitted from a first light source, having a first wavelength and polarized in a first direction and light emitted from a second light source disposed at a position different from that of the first light source, having a second wavelength and polarized in the first direction, to be incident upon the above-mentioned first optical element, two light beams can be emitted with optical axes aligned without substantially decreasing the intensity of light.

Furthermore, an optical element according to a second construction of the present invention includes: a first wavelength plate that functions substantially as a nλ plate (n is an integer) with respect to light having a first wavelength, and functions substantially as a $(2m+1)\lambda/2$ plate (m is an integer) with respect to light having a second wavelength; a second wavelength plate that functions substantially as a n'λ plate (n' is an integer) with respect to light having the first wavelength, and functions substantially as a $(2m'+1)\lambda/2$ plate (m' is an integer) with respect to light having the second wavelength; and a diffraction element that transmits light polarized in a first direction and diffracts light polarized in a second direction orthogonal to the first direction, wherein the first wavelength plate, the diffraction element, and the second wavelength plate are disposed in this order so that an angle formed by an advanced-phase axis of the first wavelength plate and the first direction and an angle formed by an advanced-phase axis of the second wavelength plate and the first direction both are substantially 45°. According to this construction, in addition to the effect of the above-mentioned first optical element, polarization directions of two emitted light beams can be aligned.

Next, an optical head apparatus of the present invention includes: a radiation light source; a converging optical system for converging a light beam from the radiation light source to form a minute spot on an information recording medium; and a photodetector for receiving a light beam reflected from the information recording medium to output a photoelectric current, wherein the radiation light source is the above-mentioned first or second light source apparatus. According to this construction, the radiation light source emits two light beams having different wavelengths with optical axes aligned, so that it is not required to provide a converging optical system and a photodetector in correspondence with light having each wavelength. Thus, a miniaturized optical head apparatus can be provided at a low cost without increasing the number of adjustment processes.

Furthermore, an optical information processing apparatus of the present invention includes an optical head apparatus for irradiating an information recording medium with a light beam and reading information from light reflected from the information recording medium, and an electronic circuit for controlling the optical head apparatus and processing the read information, wherein the optical head apparatus is the above-mentioned optical head apparatus of the present invention, and the electronic circuit controls a light source apparatus in the optical head apparatus so that it emits light having an appropriate wavelength, depending upon the kind of the information recording medium. According to this construction, an optical information processing apparatus can be provided at a low cost in a simple configuration, which is capable of recording and/or reproducing information with respect to an information recording medium using different wavelengths.

Next, a method of a first construction of the present invention for adjusting a position of an emission point, in an optical system including a first light source for emitting light having a first wavelength and polarized in a first direction, and a second light source for emitting light having a second wavelength different from the first wavelength and polarized in the first direction, comprises: allowing light emitted from the first light source and light emitted from the second light source to be incident upon a wavelength plate that functions substantially as a $(2m+1)\lambda/2$ plate (m is an integer) with respect to light having the first wavelength and functions substantially as a $n\lambda$ plate (n is an integer) with respect to light having the second wavelength, the wavelength plate converting light emitted from the first light source into light polarized in a second direction orthogonal to the first direction so as to transmit it and transmitting light emitted from the second light source without converting a polarization direction thereof, and allowing the transmitted light to be incident upon a diffraction grating so that the light polarized in the first direction is diffracted and the light polarized in the second direction is transmitted, thereby adjusting a position of an emission point so that the light emitted from the second light source has an apparent emission point different from an emission point of the second light source. According to this construction, two light beams with different wavelengths can be emitted at a high efficiency with optical axes aligned at a low cost in a simple configuration.

In the above-mentioned first method for adjusting a position of an emission point, the apparent emission point of light emitted from the second light source can be allowed to coincide with an emission point of the first light source. According to this construction, two light beams with different wavelengths can be emitted from an apparently common emission point.

Furthermore, according to the above-mentioned first method for adjusting a position of an emission point, in the case where the first light source emits light having directivity in a particular direction, the apparent emission point of light emitted from the second light source can be positioned in the particular direction from an emission point of the first light source. According to this construction, two light beams with different wavelengths can be emitted from two emission points at different positions on an apparent identical optical axis.

Furthermore, a method of a second construction according to the present invention for adjusting a position of an emission point, in an optical system including a first light source for emitting light having a first wavelength and polarized in a first direction, and a second light source for emitting light having a second wavelength different from the first wavelength and polarized in the first direction, comprises: allowing light emitted from the first light source and light emitted from the second light source to be incident upon a wavelength plate that functions substantially as a $n\lambda$ plate (n is an integer) with respect to light having the first wavelength and functions substantially as a $(2m+1)\lambda/2$ plate (m is an integer) with respect to light having the second wavelength, the wavelength plate transmitting light emitted from the first light source without converting a polarization direction thereof and converting light emitted from the second light source into light polarized in a second direction orthogonal to the first direction so as to transmit it; and allowing the transmitted light to be incident upon a diffraction grating so that the light polarized in the second direction is diffracted and the light polarized in the first direction is transmitted, thereby adjusting a position of an emission point so that the light emitted from the second light source has an apparent emission point different from an emission point of the second light source. According to this construction, two light beams with different wavelengths can be emitted at a high efficiency with optical axes aligned at a low cost in a simple configuration.

According to the above-mentioned second method for adjusting a position of an emission point, the apparent emission point of light emitted from the second light source can be allowed to coincide with an emission point of the first light source. According to this construction, two light beams with different wavelengths can be emitted from an apparent common emission point.

Furthermore, according to the above-mentioned method for adjusting a position of an emission point, in the case where the first light source emits light having directivity in a particular direction, the apparent emission point of light emitted from the second light source can be positioned in the particular direction from an emission point of the first light source. According to this construction, two light beams having different wavelengths can be emitted from two emission points at different positions on an apparent identical optical axis.

These and other advantages of the present invention will become apparent to those skilled in the art upon reading and understanding the following detailed description with reference to the accompanying figures.

DESCRIPTION OF THE PREFERRED EMBODIMENTS

Embodiment 1

Hereinafter, a light source apparatus of Embodiment 1 according to the present invention will be described with reference to the drawings.

Figure 1:
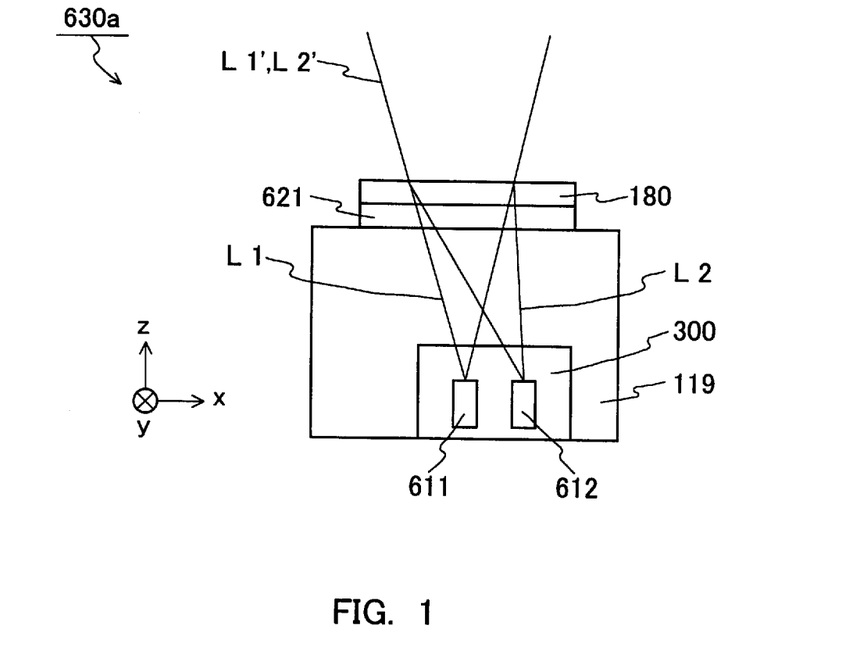
FIG. 1 shows a configuration of a light source apparatus of Embodiment 1 according to the present invention.

FIG. 1 shows a configuration of a light source apparatus 630a of Embodiment 1. For convenience of the following description, x, y, and z-coordinate axes are set as shown in the lower left portion of the figure, and an arrow direction is assumed to be a positive direction of each axis. A y-axis represents that a direction orthogonally facing the drawing surface is positive. Hereinafter, unless otherwise specified, the coordinate axes shown in FIG. 1 commonly will be used in the other figures.

Reference numeral 611 denotes a semiconductor laser with a wavelength $\lambda_1$ of 650 nm, which oscillates in a TE mode and emits a light beam L1 polarized in the x-axis direction. Reference numeral 612 denotes a semiconductor laser with a wavelength $\lambda_2$ of 780 nm, which oscillates in a TE mode and emits a light beam L2 polarized in the x-axis direction. The semiconductor lasers 611 and 612 are fixed to a holder 300 that in turn is fixed to a package 119.

Reference numeral 621 denotes a wavelength plate that is fixed to the package 119 so that an advanced-phase axis forms an angle of 45° with respect to the x-axis. Reference numeral 180 denotes a polarization anisotropic hologram element that is fixed to the package 119 via the wavelength plate 621 so as to diffract light polarized in the x-axis direction and transmit light polarized in the y-axis direction.

Figure 2:
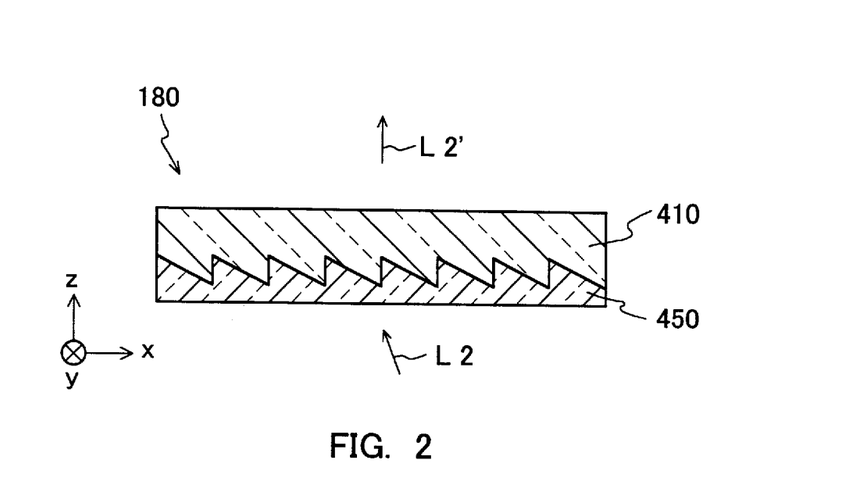
FIG. 2 is a cross-sectional view showing a configuration of a polarization anisotropic hologram element used in the light source apparatus of Embodiment 1.

First, the polarization anisotropic hologram element 180 will be described with reference to FIG. 2. Reference numeral 410 denotes an isotropic substrate on which periodic grooves with a sawtooth shape in a cross-section are formed. The sawtooth-shaped grooves are filled with a birefringent material 450. The isotropic substrate 410 and the birefringent material 450 are selected so that refractions in the y-axis direction agree with each other, whereby light polarized in this direction is not diffracted.

Furthermore, in order to diffract the light (L2) polarized in the x-axis direction at the maximum efficiency, the depth of the grooves of the birefringent material 450 is determined depending upon the amount of birefringence thereof so that the phase difference between the light passing through the deepest portion of the grooves and the light passing through the shallowest portion thereof becomes $2\pi$ at a wavelength $\lambda_2$. Because of this configuration, the light polarized in the x-axis direction is diffracted and the light polarized in the y-axis direction is transmitted.

The in-plane shape of the grooves of the polarization anisotropic hologram element 180 is designed so that an apparent emission point of the semiconductor laser 612 seen from diffracted light L2' is placed at the same position as that of an emission point of the semiconductor laser 611.

Next, the wavelength plate 621 will be described in detail. The wavelength plate 621 is designed so as to function as a $\lambda/2$ plate with respect to light having a wavelength of 650 nm ($\lambda_1$) and so as not to function with respect to light having a wavelength of 780 nm ($\lambda_2$). More specifically, a thickness d of the wavelength plate 621 is determined so that the wavelength plate 621 functions substantially as a $(2m+1)\lambda/2$ plate (m is an integer) with respect to light from the semiconductor laser 611, and functions substantially as a $n\lambda$ plate (n is an integer) with respect to light from the semiconductor laser 612.

Assuming that a difference in a refractive index between the advanced-phase axis and the lag-phase axis of the wavelength plate 621 is $\Delta n$, and an incident wavelength is $\lambda$, a phase difference $\Delta\phi$ between the advanced-phase axis and the lag-phase axis is represented by the following Equation 1.

$$\Delta\phi = \frac{2\pi}{\lambda}\Delta n \cdot d \quad (1)$$

As described above, the wavelength plate 621 is placed in such a direction as to allow the advanced-phase axis to form an angle of 45° with respect to the x-axis. Light polarized in the x-axis direction that is incident upon the wavelength plate 621 in this state is converted into light polarized in the y-axis direction in a given ratio determined by the phase difference $\Delta\phi$.

Assuming that the intensity of incident light polarized in the x-axis direction is $I_0$ the intensity $I_y$ of light (polarization direction is the y-axis direction) converted into light polarized in the y-axis direction by the wavelength plate 621 is represented by the following Equation 2.

$$I_y = I_0 \cdot \sin^2\left(\frac{\Delta\phi}{2}\right) \quad (2)$$

Furthermore, the intensity $I_x$ of light (polarization direction is the x-axis direction) that is not converted is represented by the following Equation 3.

$$I_x = I_0 \cdot \cos^2\left(\frac{\Delta\phi}{2}\right) \quad (3)$$

Both $I_x$ and $I_y$ depend on $\Delta\phi$, and $\Delta\phi$ depends on the wavelength $\lambda$ of incident light. Thus, $I_x$ and $I_y$ behave differently depending upon the wavelength. The wavelength plate 621 utilizes this difference to carry out the above-mentioned function.

As described above, the polarization anisotropic hologram element 180 is disposed so as to diffract light polarized in the x-axis direction and transmit light polarized in the y-axis direction. Therefore, in order to realize the light source apparatus of the present embodiment, the thickness d of the wavelength plate 621 only needs to be determined so as to maximize both the intensity $I_y(\lambda_1)$ of a y-axis component of light obtained from the light beam L1 (wavelength $\lambda_1$) emitted from the semiconductor laser 611 after passing through the wavelength plate 621 and the intensity $I_x(\lambda_2)$ of an x-axis component of light obtained from the light beam L2 (wavelength $\lambda_2$) emitted from the semiconductor laser 612 after passing through the wavelength plate 621.

Figure 3:
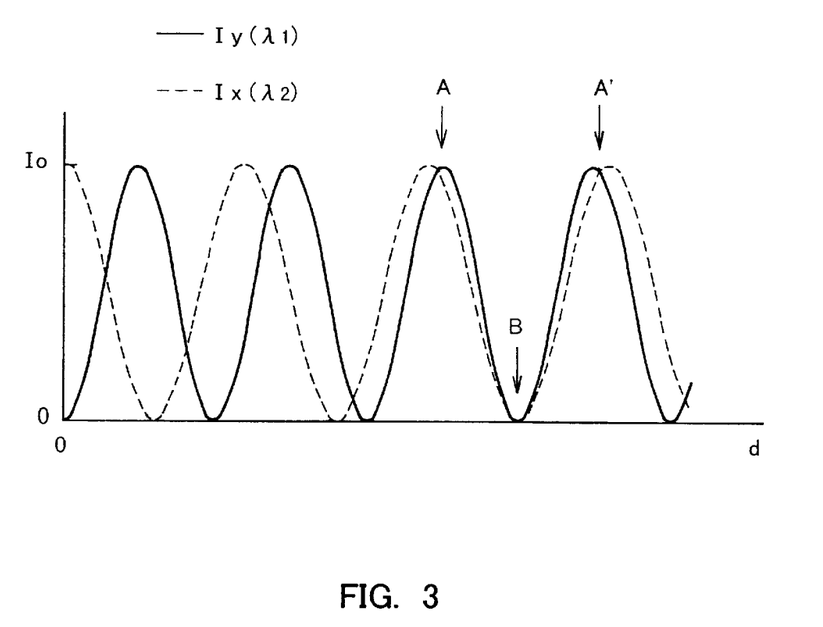
FIG. 3 illustrates a wavelength plate of Embodiment 1 according to the present invention.

FIG. 3 shows a relationship between $I_y(\lambda_1)$ and $I_x(\lambda_2)$, and the thickness d of the wavelength plate 621. The vertical axis represents the intensity of emitted light. As is apparent from the above-mentioned Equations 1 to 3, $I_y(\lambda_1)$ represented by a solid line and $I_x(\lambda_2)$ represented by a dotted line periodically are varied depending upon the change in the thickness d, and the difference in a period therebetween is caused by the difference in a wavelength.

As is apparent from FIG. 3, if the thickness d is taken at a position A, the efficiency becomes maximum. The wavelength plate 621 having a thickness at the position A functions substantially as a 2.5λ plate with respect to light having a wavelength $\lambda_1$ (650 nm) and substantially as a 2λ plate with respect to light having a wavelength $\lambda_2$ (780 nm). Although the position A is not optimum with respect to each wavelength, it is an intermediate position between the optimum positions of the respective wavelengths, so that a practical problem will not occur. This position only needs to be determined appropriately in the vicinity of the position A, depending upon the particular aspects of a system to be used. Furthermore, substantially the same characteristics can be obtained even at a position A'.

Figure 4:
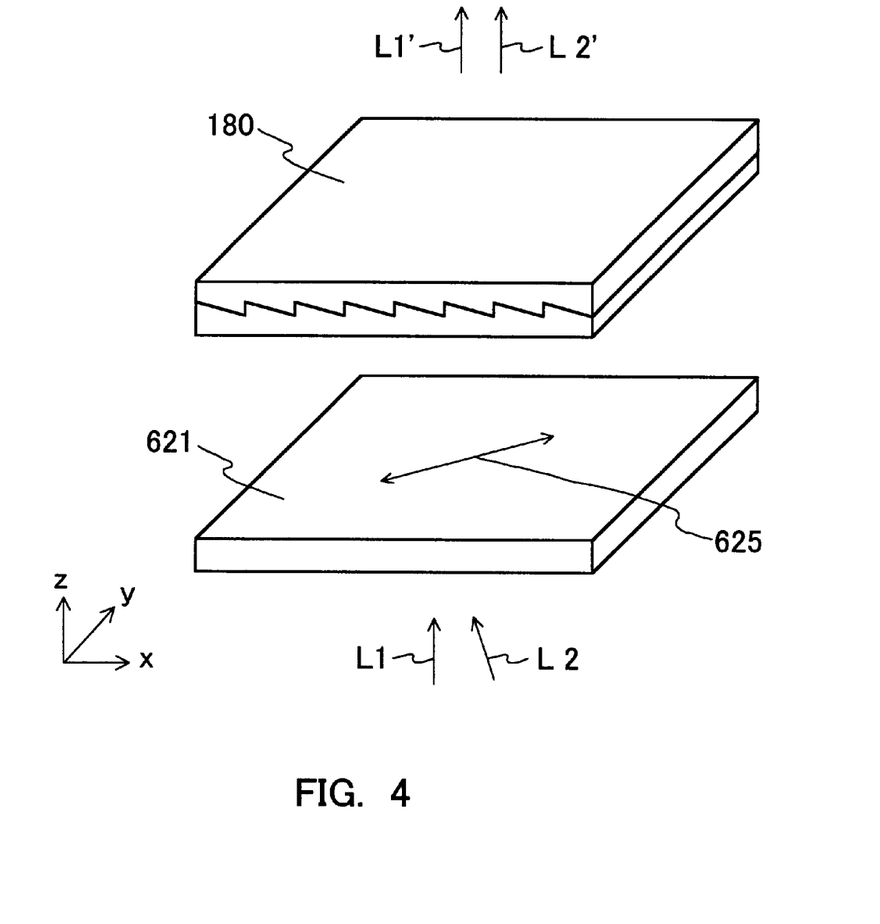
FIG. 4 is a view showing directions in which the polarization anisotropic hologram element and the wavelength plate are disposed in the light source apparatus of Embodiment 1 according to the present invention.

In the light source apparatus of the present embodiment, the polarization anisotropic hologram element 180 and the wavelength plate 621 are disposed in a positional relationship shown in FIG. 4, thereby realizing the operations thereof. In FIG. 4, reference numeral 625 denotes an advanced-phase axis direction of the wavelength plate 621.

Hereinafter, the operation of the light source apparatus of the present embodiment according to the present invention will be described with reference to FIG. 1. The light beam L1 polarized in the x-axis direction from the semiconductor laser 611 is converted into light polarized in the y-axis direction by the wavelength plate 621. The light beam L1 further is incident upon the polarization anisotropic hologram element 180. Since the polarization anisotropic hologram element 180 transmits light polarized in the y-axis direction, an apparent emission point seen from the transmitted light L1' does not move and is positioned at an emission end of the semiconductor laser 611.

The light beam L2 polarized in the x-axis direction from the semiconductor laser 612 is incident upon the wavelength plate 621 and passes therethrough with the polarization direction thereof maintained in the x-axis direction. The light beam L2 further is incident upon the polarization anisotropic hologram element 180. Since the polarization anisotropic hologram element 180 diffracts light polarized in the x-axis direction, an apparent emission point seen from the diffracted light L2' moves. The groove shape of the polarization anisotropic hologram element 180 is designed so that an apparent emission point seen from the diffracted light L2' is placed at an emission position of the semiconductor laser 611. Thus, when seen from the emission side, the light source apparatus can be operated as if it emitted the light L1' and L2' from the same point.

As described above, according to the present invention, a light source apparatus easily can be provided at a high efficiency, which generates two light beams with different wavelengths having an emission point in common apparently.

In the above example, even when a polarization anisotropic hologram element that transmits light polarized in the x-axis direction and diffracts light polarized in the y-axis direction is used as the polarization anisotropic hologram element 180, a light source apparatus can be obtained that generates two light beams with different wavelengths.

Hereinafter, a light source apparatus having such a configuration will be described.

The basic configuration of the above-mentioned light source apparatus is the same as that shown in FIG. 1, except that a polarization anisotropic hologram element transmitting light polarized in the x-axis direction and diffracting light polarized in the y-axis direction is used as the polarization anisotropic hologram element 180. Furthermore, the wavelength plate 621 in this apparatus is designed so as not to function with respect to light having a wavelength of 650 nm ($\lambda_1$) and so as to function as a λ/2 plate with respect to light having a wavelength of 780 nm ($\lambda_2$). More specifically, the thickness d of the wavelength plate 621 is determined so that the wavelength plate 621 functions substantially as a nλ plate (n is an integer) with respect to light from the semiconductor laser 611, and functions substantially as a (2m+1)λ/2 plate (m is an integer) with respect to light from the semiconductor laser 612. This is realized, for example, by designing the thickness d of the wavelength plate 621 at a position B in FIG. 3. In this case, the wavelength plate 621 functions as a 3λ plate with respect to the light beam L1 and as a 2.5λ plate with respect to the light beam L2.

The above-mentioned configuration is optimum for both the light having a wavelength $\lambda_1$ (650 nm) and the light having a wavelength $\lambda_2$ (780 nm), which realizes a light source apparatus generating two light beams with different wavelengths at a higher efficiency. The same effects also can be obtained even with the use of the wavelength plate 621 with a thickness so as to function as a 6λ plate with respect to the light beam L1.

Embodiment 2

Figure 5:
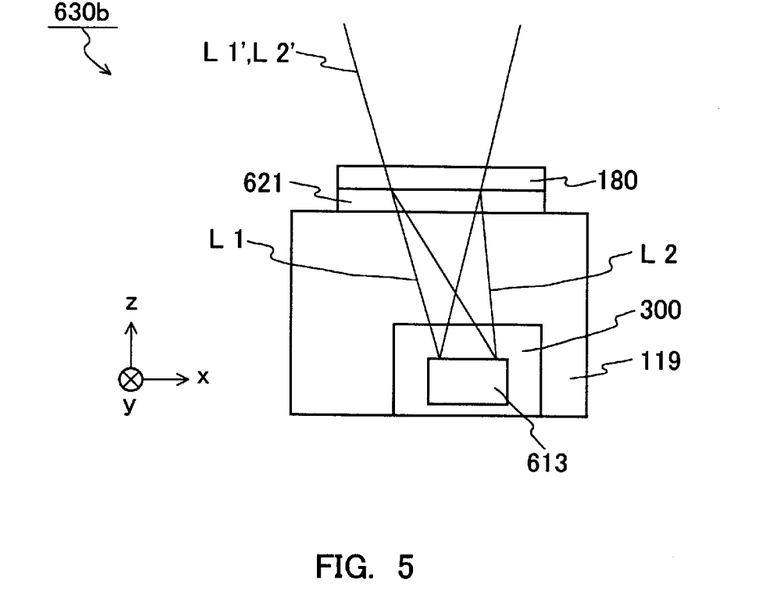
FIG. 5 shows a configuration of a light source apparatus of Embodiment 2 according to the present invention.

FIG. 5 shows a configuration of a light source apparatus 630b of Embodiment 2. In Embodiment 2, the semiconductor lasers 611 and 612 in Embodiment 1 are replaced by a semiconductor laser 613. The other configuration is the same as that in Embodiment 1. The semiconductor laser 613 is obtained by integrating the semiconductor lasers 611 and 612 in a monolithic manner, in which an interval between emission points of light beams with two wavelengths can be determined with good precision. Therefore, a light source apparatus can be realized in which emission points coincide with each other with high precision.

Embodiment 3

Figure 6:
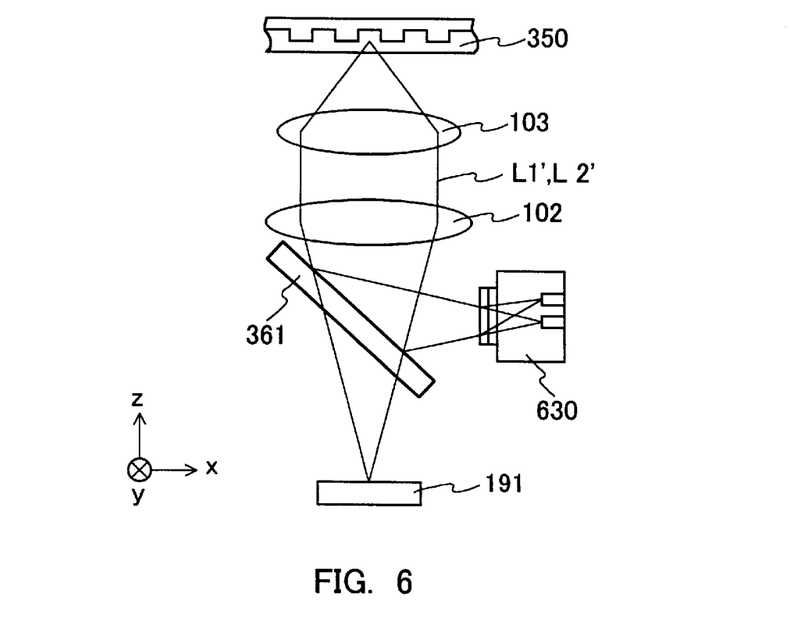
FIG. 6 shows a configuration of an optical head apparatus of Embodiment 3 according to the present invention.

FIG. 6 shows a configuration of an optical head apparatus of Embodiment 3. A light source apparatus 630 is either the light source apparatus 630a of Embodiment 1 or the light source apparatus 630b of Embodiment 2 and emits light beams L1' and L2' with two different wavelengths from the same apparent point.

The light source apparatus 630 emits one of the light beams L1' and L2' or both of them simultaneously, depending upon the kind of an optical disk 350. The emitted light (L1', L2') is reflected from a beam splitter 361, and is converged onto the optical disk 350 through a collimating lens 102 and an objective lens 103 (one-way path). Furthermore, the light passes through an optical path opposite to the one-way path as reflected light containing information recorded on the optical disk 350, and is incident upon the beam splitter 361. The light passes through the beam splitter 361 to be provided with astigmatism, and is received by a photodetector 191. At the photodetector 191, required information such as a focus servo signal is taken out by a plurality of divided light-receiving elements.

In a conventional optical head, two light sources are placed at different positions, so that two photodetectos are required in accordance with the respective light beams. In the present embodiment, only one photodetector 191 is required, and the adjustment process accompanied by using two photodetectors can be simplified, which results in an inexpensive optical head apparatus.

Embodiment 4

Figure 7:
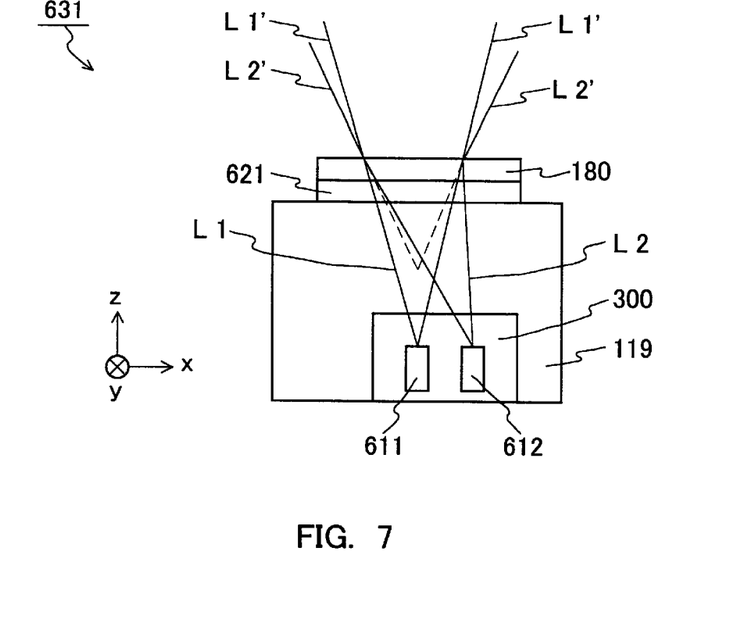
FIG. 7 shows a configuration of a light source apparatus of Embodiment 4 according to the present invention.

FIG. 7 shows a configuration of a light source apparatus 631 of Embodiment 4. In Embodiment 4, the in-plane shape of the grooves of the polarization anisotropic hologram element 180 of Embodiment 1 is designed so that an apparent emission point of diffracted light L2' of the semiconductor laser 612 is placed at a different position on the identical optical axis from an emission point of the semiconductor laser 611.

In the present embodiment, a light source apparatus is obtained that can be used in an optical head apparatus and the like in which aberration needs to be corrected by shifting positions in optical axis directions of emission points of light with two different wavelengths.

The present embodiment can be realized even when the semiconductor lasers 611 and 612 are replaced by the semiconductor laser 613 in which the semiconductor lasers 611 and 612 are integrated in a monolithic manner as in Embodiment 2. Because of this, a light source apparatus having optical axes aligned with good precision can be realized.

Embodiment 5

Figure 8:
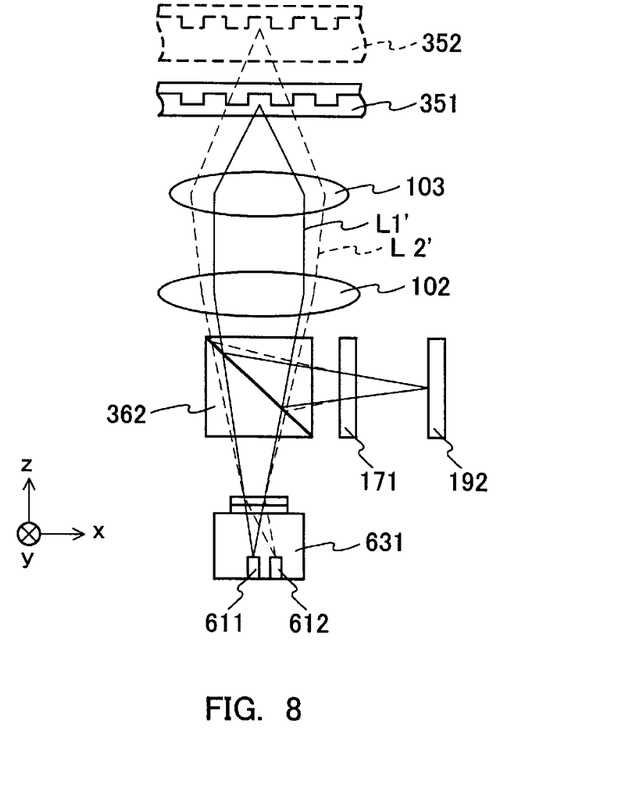
FIG. 8 shows a configuration of an optical head apparatus of Embodiment 5 according to the present invention.

FIG. 8 shows a configuration of an optical head apparatus of Embodiment 5. In the present embodiment, the light source apparatus 631 of Embodiment 4 is used that emits light beams L1' and L2' with different wavelengths from two points shifted apparently in an optical axis direction.

The light source apparatus 631 emits either the light beam L1' or the light beam L2', depending upon the kind of an optical disk.

First, the case of recording and/or reproducing information with respect to an optical disk 351 will be described. In this case, the semiconductor laser 611 is allowed to emit light, and the light source apparatus 631 is allowed to output the light beam L1'. The emitted light beam L1' passes through a beam splitter 362, is collimated by the collimating lens 102, passes through the objective lens 103, and is converged onto the optical disk 351 (one-way path). Furthermore, this light passes through an optical path opposite to the one-way path as reflected light containing information recorded on the optical disk 351, and is incident upon the beam splitter 362. The light is reflected from the beam splitter 362, and for the purpose of detecting a servo signal, has its wave front converted by a hologram element 171 and is received by a photodetector 192.

Next, the case of recording and/or reproducing information with respect to an optical disk 352 having a thickness different from that of the optical disk 351 will be described. In this case, the semiconductor laser 612 is allowed to emit light, and the light source apparatus 631 is allowed to output the light beam L2'. The emitted light beam L2' passes through the beam splitter 362, is converted into light slightly shifted from collimated light by the collimating lens 102, and is converged onto the optical disk 352 through the objective lens 103 (one-way path). At this time, since the light slightly shifted from collimated light is incident upon the objective lens 103, spherical aberration caused by the difference in thickness of an optical disk substrate is corrected. The light beam L2' further passes through an optical path opposite to the one-way path as reflected light containing information recorded on the optical disk 352, and is incident upon the beam splitter 362. The light is reflected from the beam splitter 362, and for the purpose of detecting a servo signal, has its front wave converted by the hologram element 171 and is received by the photodetector 192.

In the present embodiment, an optical head apparatus easily can be provided at a low cost, which is capable of recording and/or reproducing information with respect to optical disks having different thicknesses.

Embodiment 6

Figure 9:
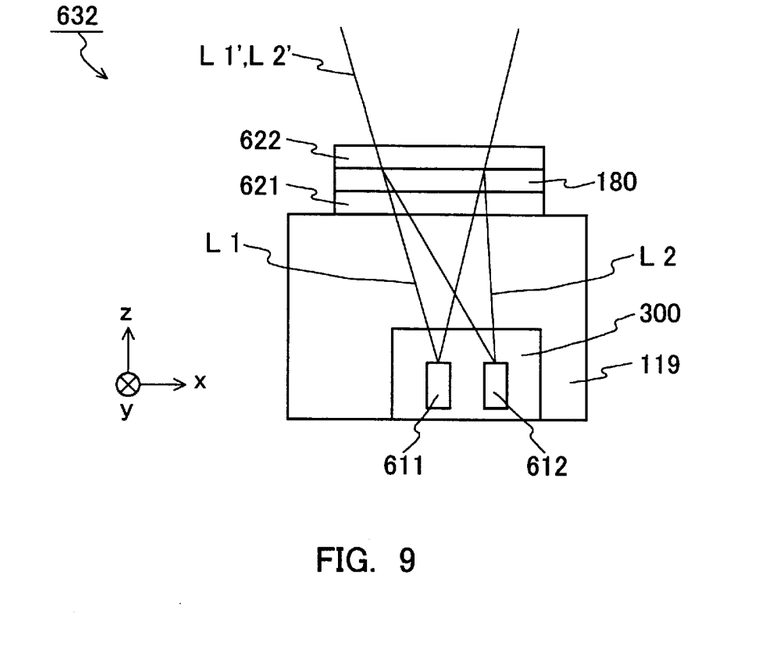
FIG. 9 shows a configuration of a light source apparatus of Embodiment 6 according to the present invention.

FIG. 9 shows a configuration of a light source apparatus 632 of Embodiment 6. The light source apparatus 632 of the present embodiment is used for an optical system that separates a one-way path from a return path at a high efficiency, using polarization.

The light source apparatuses of Embodiments 1, 2, and 4 cannot be used for an optical system of a round optical path including a combination of a λ/4 plate and a polarization splitting optical system because the polarization directions of the light beams L1' and L2' are orthogonal to each other. The light source apparatus 632 of the present embodiment solves this problem by using a wavelength plate 622.

The wavelength plate 622 functions in the same way as the wavelength plate 621. The wavelength plates 621 and 622 are disposed so that the advanced-phase axes are positioned in the same direction or orthogonal to each other, and stacked adjacent to each other with the polarization anisotropic hologram element 180 interposed therebetween. The wavelength plate 622 can return the polarization direction of light to that before being changed by the wavelength plate 621. Thus, a light source apparatus can be realized in which the polarization directions of the light beams L1' and L2' coincide with each other.

Embodiment 7

Figure 10:
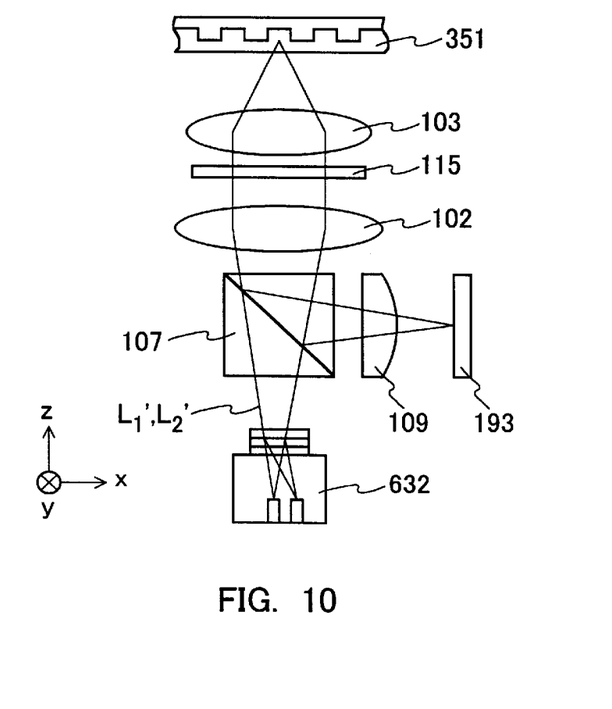
FIG. 10 shows a configuration of an optical head apparatus of Embodiment 7 according to the present invention.

FIG. 10 shows a configuration of an optical head apparatus of Embodiment 7. In the present embodiment, the light source apparatus 632 of Embodiment 6 emits, from the same apparent point, light beams L1' and L2' having two different wavelengths with polarization directions aligned.

The light source apparatus 632 emits one of the light beams L1' and L2' or both of them simultaneously, depending upon the kind of the optical disk 351. The emitted light (L1', L2') passes through a polarization beam splitter 107, and is collimated by the collimating lens 102. Thereafter, the light is circularly polarized by a quarter wavelength plate 115, and condensed onto the optical disk 351 through the objective lens 103 (one-way path). Furthermore, the light is incident upon the polarization beam splitter 107 through an optical path opposite to the one-way path as reflected light containing information recorded on the optical disk 351. At this time, the circularly polarized light is converted into polarized light orthogonal to the one-way path by the quarter wavelength plate 115. The light is reflected from the polarization beam splitter 107, is provided with astigmatism by a cylindrical lens 109, and received by a photodetector 193. At the photodetector 193, required information such as a focus servo signal is taken out by a plurality of divided light-receiving elements.

In the present embodiment, since a one-way path is separated from a return path efficiently, a high-efficiency optical head apparatus can be realized.

Embodiment 8

Figure 11:
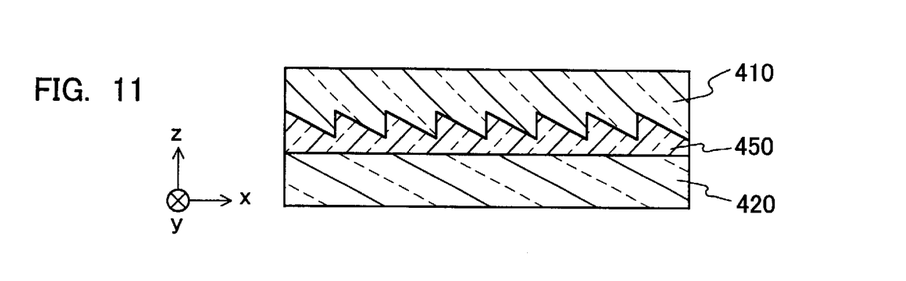
FIG. 11 is a cross-sectional view showing a configuration of an optical element of Embodiment 8 according to the present invention.

FIG. 11 is a cross-sectional view showing a configuration of an optical element of Embodiment 8. Reference numeral 410 denotes an isotropic substrate on which periodic grooves having a sawtooth shape in a cross-section are formed. The sawtooth-shaped grooves are filled with a birefringent material 450. The isotropic substrate 410 and the birefringent material 450 are selected so that refractions in the y-axis direction agree with each other, whereby light polarized in this direction is not diffracted.

Furthermore, in order to diffract the light (L2) with a wavelength $\lambda_2$ polarized in the x-axis direction at the maximum efficiency, the depth of the grooves of the birefringent material 450 is determined depending upon the amount of birefringence thereof so that the phase difference between the light passing through the deepest portion of the grooves and the light passing through the shallowest portion thereof becomes $2\pi$ at a wavelength $\lambda_2$. Because of this configuration, the light polarized in the x-axis direction is diffracted and the light polarized in the y-axis direction is transmitted.

Furthermore, in the present optical element, the birefringent substrate 420 designed so as to function as a $\lambda/2$ plate with respect to the light having a wavelength $\lambda_1$ of 650 nm and so as not to function with respect to the light having a wavelength $\lambda_2$ of 780 nm is disposed on the surface of the birefringent material 450 opposite to the isotropic substrate 410 in such a manner that the advanced-phase axis forms an angle of 45° with respect to the x-axis.

In the present optical element, the polarization anisotropic hologram element composed of the isotropic substrate 410 and the birefringent material 450, and the wavelength plate (birefringent substrate 420) are integrated. Therefore, the optical element is small. Furthermore, the optical element can be produced and cut out in a wafer state, which is suitable for mass-production

Embodiment 9

Figure 12:
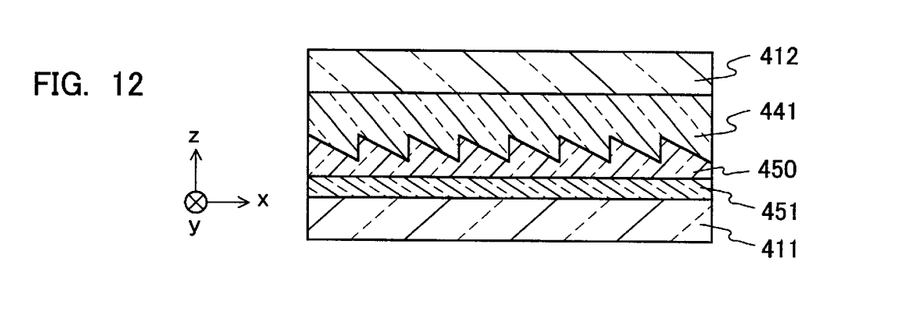
FIG. 12 is a cross-sectional view showing a configuration of an optical element of Embodiment 9 according to the present invention.

FIG. 12 is a cross-sectional view showing a configuration of an optical element of Embodiment 9. A thin film made of a birefringent material 451 such as resin is formed or bonded to the surface of an isotropic substrate 411. Furthermore, a birefringent material 450 having a sawtooth shape in a cross-section is formed on the thin film, and the sawtooth-shaped grooves are filled with an isotropic material 441. Furthermore, in order to enhance the resistance to environment such as humidity, an isotropic substrate 412 is bonded to the isotropic material 441. The birefringent material 450 and the isotropic material 441 are selected so that refractions in the y-axis direction agree with each other, whereby light polarized in this direction is not diffracted.

Furthermore, in order to diffract the light (L2) with a wavelength $\lambda_2$ polarized in the x-axis direction at the maximum efficiency, the depth of the grooves of the birefringent material 450 is determined so that the phase difference between the light passing through the deepest portion of the grooves and the light passing through the shallowest portion thereof becomes $2\pi$ at a wavelength $\lambda_2$. Because of this configuration, the light polarized in the x-axis direction is diffracted and the light polarized in the y-axis direction is transmitted.

Furthermore, in the present optical element, the thickness of the birefringent material 451 is designed so that the birefringent material 451 functions as a $\lambda/2$ plate with respect to the light having a wavelength of 650 nm ($\lambda_1$) and does not function with respect to the light having a wavelength of 780 nm ($\lambda_2$), and the birefringent material 451 is disposed so that the advanced-phase axis of the birefringent material 451 forms an angle of 45° with respect to the x-axis.

In the present optical element, the polarization anisotropic hologram element composed of the isotropic material 441 and the birefringent material 450, and the wavelength plate (birefringent material 451) are integrated. Therefore, the optical element is small. Furthermore, the optical element can be produced and cut out in a wafer state, which is suitable for mass-production.

Embodiment 10

Figure 13:
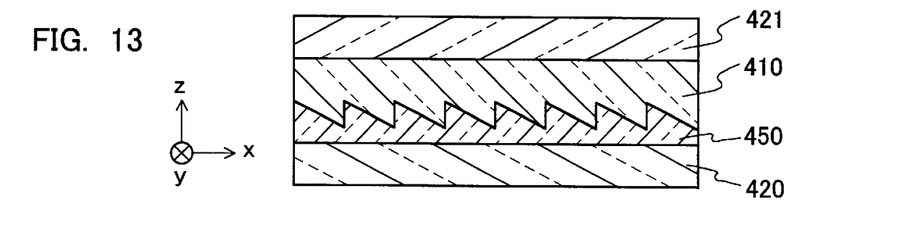
FIG. 13 is a cross-sectional view showing a configuration of an optical element of Embodiment 10 according to the present invention.

FIG. 13 is a cross-sectional view showing a configuration of an optical element of Embodiment 10. In the present optical element, a birefringent substrate 421 is integrated onto the isotropic substrate 410 of the optical element of Embodiment 8 (FIG. 11). The same members as those in Embodiment 8 are denoted with the same reference numerals as those therein, and repeated description thereof will be omitted here. By allowing the birefringent substrate 421 to have the same function as that of the birefringent substrate 420, polarization directions of two emitted light beams can be aligned with each other as described in Embodiment 6.

Embodiment 11

Figure 14:
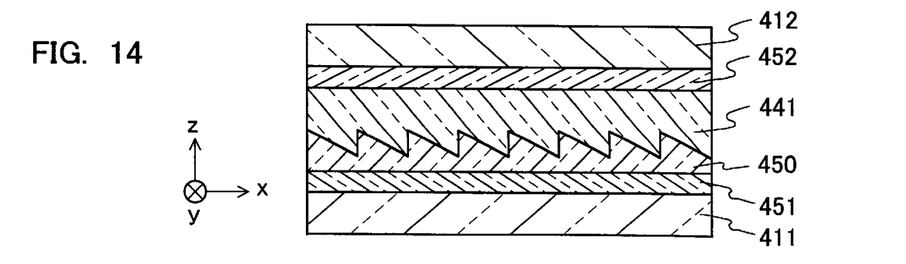
FIG. 14 is a cross-sectional view showing a configuration of an optical element of Embodiment 11 according to the present invention.

FIG. 14 is a cross-sectional view showing a configuration of an optical element of Embodiment 11. In the present optical element, a birefringent material 452 is integrated between the isotropic material 441 and the isotropic substrate 412 of the optical element of Embodiment 9 (FIG. 12). The same members as those in Embodiment 9 are denoted with the same reference numerals as those therein, and repeated description thereof will be omitted here. By allowing the birefringent material 452 to have the same function as that of the birefringent material 451, polarization directions of two emitted light beams can be aligned with each other as described in Embodiment 6.

Embodiment 12

Figure 15:
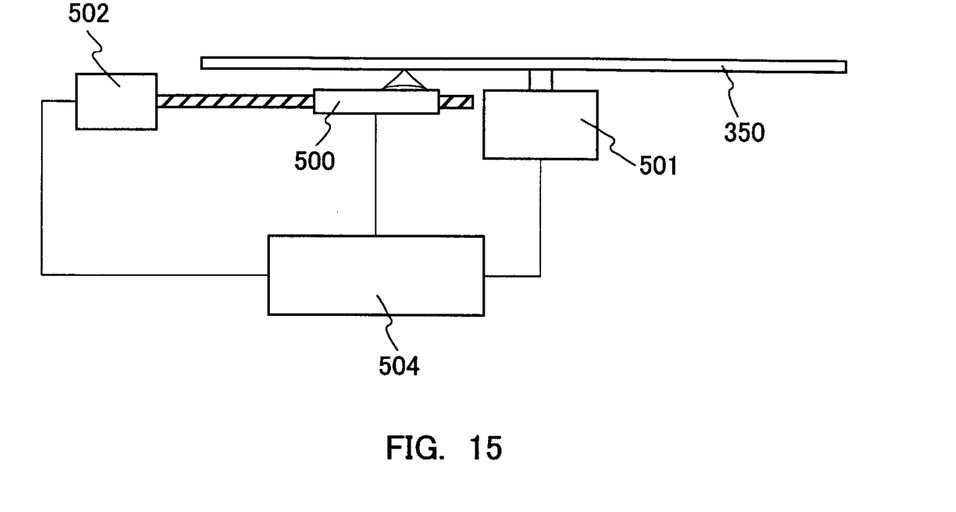
FIG. 15 shows a configuration of an optical information processing apparatus of Embodiment 12 according to the present invention.

FIG. 15 shows a configuration of an optical information processing apparatus of Embodiment 12. An optical disk 350 is rotated by a rotation mechanism 501. An optical head apparatus 500 is moved by a driving apparatus 502 to a track of the optical disk 350 in which desired information is present. The optical head apparatus 500 also sends a focus error signal and a tracking error signal to an electronic circuit 504, in correspondence with a positional relationship with respect to the optical disk 350. In response to the signals, the electronic circuit 504 sends a signal for minutely moving an objective lens to the optical head apparatus 500. Based on this signal, the optical head conducts a focusing servo and a tracking servo with respect to the optical disk 350, and reads, writes, or deletes information with respect to the optical disk 350. Furthermore, the electronic circuit 504 also has a function of identifying the kind of the optical disk 350 and controlling a semiconductor laser in the optical head apparatus 500 so that it emits light with an appropriate wavelength.

As the optical head apparatus 500, either one of Embodiments 3, 5, and 7 can be used. Since the optical information processing apparatus of the present embodiment uses the optical head apparatus 500 with the above-mentioned configuration, recording and/or reproducing of information with respect to different kinds of optical disks can be realized.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A light source apparatus, comprising:
   a first light source for emitting light having a first wavelength and polarized in a first direction;
   a second light source for emitting light having a second wavelength different from the first wavelength and polarized in the first direction;
   a wavelength plate that functions substantially as a $(2m+1)\lambda/2$ plate (m is an integer) with respect to light having the first wavelength, and functions substantially as a $n\lambda$ plate (n is an integer) with respect to light having the second wavelength; and
   a diffraction element that diffracts light polarized in the first direction and transmits light polarized in a second direction orthogonal to the first direction,
   wherein the wavelength plate converts light emitted from the first light source into light polarized in the second direction so as to transmit it, and transmits light emitted from the second light source without converting a polarization direction thereof, and
   the diffraction element diffracts light emitted from the second light source, passing through the wavelength plate,
   whereby the light emitted from the second light source, diffracted by the diffraction element, has an apparent emission point different from an emission point of the second light source.

2. A light source apparatus according to claim 1, wherein the apparent emission point of the light emitted from the second light source coincides with an emission point of the first light source.

3. A light source apparatus according to claim 1, wherein the first light source emits light having directivity in a particular direction, and the apparent emission point of the light emitted from the second light source is positioned in the particular direction from an emission point of the first light source.

4. A light source apparatus according to claim 1, further comprising a second wavelength plate that functions substantially as a $(2m'+1)\lambda/2$ plate (m' is an integer) with respect to light having the first wavelength, and functions substantially as a $n'\lambda$ plate (n' is an integer) with respect to light having the second wavelength,
   wherein the second wavelength plate converts the light emitted from the first light source, which is converted into light polarized in the second direction, into light polarized in the first direction.

5. A light source apparatus, comprising:
   a first light source for emitting light having a first wavelength and polarized in a first direction;
   a second light source for emitting light having a second wavelength different from the first wavelength and polarized in the first direction;
   a wavelength plate that functions substantially as a $n\lambda$ plate (n is an integer) with respect to light having the first wavelength, and functions substantially as a $(2m+1)\lambda/2$ plate (m is an integer) with respect to light having the second wavelength; and
   a diffraction element that transmits light polarized in the first direction and diffracts light polarized in a second direction orthogonal to the first direction,
   wherein the wavelength plate converts light emitted from the second light source into light polarized in the second direction so as to transmit it, and transmits light emitted from the first light source without converting a polarization direction thereof, and
   the diffraction element diffracts the light emitted from the second light source, passing through the wavelength plate,
   whereby the light emitted from the second light source, diffracted by the diffraction element, has an apparent emission point different from an emission point of the second light source.

6. A light source apparatus according to claim 5, wherein the apparent emission point of the light emitted from the second light source coincides with an emission point of the first light source.

7. A light source apparatus according to claim 5, wherein the first light source emits light having directivity in a particular direction, and the apparent emission point of the light emitted from the second light source is positioned in the particular direction from an emission point of the first light source.

8. A light source apparatus according to claim 5, further comprising a second wavelength plate that functions substantially as a $n'\lambda$ plate (n' is an integer) with respect to light having the first wavelength and functions substantially as a $(2m'+1)\lambda/2$ plate (m' is an integer) with respect to light having the second wavelength, wherein the second wavelength plate converts the light emitted from the second light source, which is converted into light polarized in the second direction, into light polarized in the first direction.

9. An optical element comprising:
a wavelength plate that functions substantially as a $n\lambda$ plate (n is an integer) with respect to light having a first wavelength, and functions substantially as a $(2m+1)\lambda/2$ plate (m is an integer) with respect to light having a second wavelength; and
a diffraction element that transmits light polarized in a first direction and diffracts light polarized in a second direction orthogonal to the first direction,
wherein the wavelength plate and the diffraction element are disposed so that an angle formed by an advanced-phase axis of the wavelength plate and the first direction is substantially 45°.

10. An optical element comprising:
a first wavelength plate that functions substantially as a $n\lambda$ plate (n is an integer) with respect to light having a first wavelength, and functions substantially as a $(2m+1)\lambda/2$ plate (m is an integer) with respect to light having a second wavelength;
a second wavelength plate that functions substantially as a $n'\lambda$ plate (n' is an integer) with respect to light having the first wavelength, and functions substantially as a $(2m'+1)\lambda/2$ plate (m' is an integer) with respect to light having the second wavelength; and
a diffraction element that transmits light polarized in a first direction and diffracts light polarized in a second direction orthogonal to the first direction,
wherein the first wavelength plate, the diffraction element, and the second wavelength plate are disposed in this order so that an angle formed by an advanced-phase axis of the first wavelength plate and the first direction and an angle formed by an advanced-phase axis of the second wavelength plate and the first direction both are substantially 45°.

11. An optical head apparatus comprising: a radiation light source; a converging optical system for converging a light beam from the radiation light source to form a minute spot on an information recording medium; and a photodetector for receiving a light beam reflected from the information recording medium to output a photoelectric current, wherein the radiation light source is a light source apparatus of claim 1.

12. An optical information processing apparatus comprising an optical head apparatus for irradiating an information recording medium with a light beam and reading information from light reflected from the information recording medium, and an electronic circuit for controlling the optical head apparatus and processing the read information,
wherein the optical head apparatus is an optical head apparatus of claim 11, and
the electronic circuit controls the light source apparatus in the optical head apparatus so that it emits light having an appropriate wavelength, depending upon the kind of the information recording medium.

13. A method for adjusting a position of an emission point, in an optical system including a first light source for emitting light having a first wavelength and polarized in a first direction, and a second light source for emitting light having a second wavelength different from the first wavelength and polarized in the first direction, comprising:

allowing light emitted from the first light source and light emitted from the second light source to be incident upon a wavelength plate that functions substantially as a $(2m+1)\lambda/2$ plate (m is an integer) with respect to light having the first wavelength and functions substantially as a $n\lambda$ plate (n is an integer) with respect to light having the second wavelength, the wavelength plate converting light emitted from the first light source into light polarized in a second direction orthogonal to the first direction so as to transmit it and transmitting light emitted from the second light source without converting a polarization direction thereof; and
allowing the transmitted light to be incident upon a diffraction grating so that the light polarized in the first direction is diffracted and the light polarized in the second direction is transmitted,
thereby adjusting a position of an emission point so that the light emitted from the second light source has an apparent emission point different from an emission point of the second light source.

14. A method for adjusting a position of an emission point according to claim 13, wherein the apparent emission point of light emitted from the second light source is allowed to coincide with an emission point of the first light source.

15. A method for adjusting a position of an emission point according to claim 13, wherein the first light source emits light having directivity in a particular direction, and the apparent emission point of light emitted from the second light source is positioned in the particular direction from an emission point of the first light source.

16. A method for adjusting a position of an emission point, in an optical system including a first light source for emitting light having a first wavelength and polarized in a first direction, and a second light source for emitting light having a second wavelength different from the first wavelength and polarized in the first direction, comprising:
allowing light emitted from the first light source and light emitted from the second light source to be incident upon a wavelength plate that functions substantially as a $n\lambda$ plate (n is an integer) with respect to light having the first wavelength and functions substantially as a $(2m+1)\lambda/2$ plate (m is an integer) with respect to light having the second wavelength, the wavelength plate transmitting light emitted from the first light source without converting a polarization direction thereof and converting light emitted from the second light source into light polarized in a second direction orthogonal to the first direction so as to transmit it; and
allowing the transmitted light to be incident upon a diffraction grating so that the light polarized in the second direction is diffracted and the light polarized in the first direction is transmitted,
thereby adjusting a position of an emission point so that the light emitted from the second light source has an apparent emission point different from an emission point of the second light source.

17. A method for adjusting a position of an emission point according to claim 16, wherein the apparent emission point of light emitted from the second light source is allowed to coincide with an emission point of the first light source.

18. A method for adjusting a position of an emission point according to claim 16, wherein the first light source emits light having directivity in a particular direction, and the apparent emission point of light emitted from the second light source is positioned in the particular direction from an emission point of the first light source.

19. An optical head apparatus comprising: a radiation light source; a converging optical system for converging a light beam from the radiation light source to form a minute spot on an information recording medium; and a photodetector for receiving a light beam reflected from the information recording medium to output a photoelectric current, wherein the radiation light source is a light source apparatus of claim 5.

20. An optical head apparatus comprising: a radiation light source; a converging optical system for converging a light beam from the radiation light source to form a minute spot on an information recording medium; and a photodetector for receiving a light beam reflected from the information recording medium to output a photoelectric current, wherein the radiation light source is a light source apparatus of claim 9.

21. An optical head apparatus comprising: a radiation light source; a converging optical system for converging a light beam from the radiation light source to form a minute spot on an information recording medium; and a photodetector for receiving a light beam reflected from the information recording medium to output a photoelectric current, wherein the radiation light source is a light source apparatus of claim 10.

* * * * *